(12) United States Patent
Groitzsch et al.

(10) Patent No.: US 6,723,416 B1
(45) Date of Patent: Apr. 20, 2004

(54) FLAT NONWOVEN FIBER AGGREGATE WITH THREE-DIMENSIONAL STRUCTURE AND METHOD FOR ITS PRODUCTION

(75) Inventors: Dieter Groitzsch, Hirschberg (DE); Gerhard Schaut, Hemsbach (DE); Hans-Jörg Grimm, Weinheim (DE)

(73) Assignee: Firma Carl Freudenberg (DE)

( * ) Notice: Subject to any disclaimer, the term of this patent is extended or adjusted under 35 U.S.C. 154(b) by 0 days.

(21) Appl. No.: 09/869,710

(22) PCT Filed: Oct. 29, 1999

(86) PCT No.: PCT/EP99/08225
§ 371 (c)(1),
(2), (4) Date: Aug. 22, 2001

(87) PCT Pub. No.: WO00/40793
PCT Pub. Date: Jul. 13, 2000

(30) Foreign Application Priority Data

Jan. 8, 1999 (DE) .......................... 199 00 424

(51) Int. Cl.[7] .................................. B32B 5/26
(52) U.S. Cl. .................. 428/141; 428/174; 428/175; 428/176; 442/35; 442/36; 442/361; 442/362; 442/364; 156/73.1; 156/73.2; 156/219; 26/18.5
(58) Field of Search ................. 428/141, 174, 428/175, 176; 442/35, 36, 361, 362, 364; 156/73.1, 73.2, 219; 26/18.5

(56) References Cited

U.S. PATENT DOCUMENTS

| 4,302,495 A | 11/1981 | Marra |
| 4,522,863 A | 6/1985 | Keck et al. |
| 5,393,599 A | 2/1995 | Quantrille et al. |
| 5,525,397 A | 6/1996 | Shizuno et al. |
| 5,733,826 A | 3/1998 | Groitzsch |

FOREIGN PATENT DOCUMENTS

| DE | 41 30 343 | 3/1993 |
| EP | 0 106 604 | 4/1984 |
| EP | 0 482 918 | 4/1992 |
| GB | 1 331 817 | 9/1973 |
| WO | 98/52458 | 11/1998 |

*Primary Examiner*—Ula C. Ruddock
(74) *Attorney, Agent, or Firm*—Kenyon & Kenyon

(57) ABSTRACT

A three-dimensionally structured fibrous web made up of continuous-filament layers which alternate perpendicular to the surface plane, and denser short-fiber layers that are permanently thermally bonded in a continuous or spot-like manner to the filament layers, the wide-mesh continuous-filament layers representing a scrim, lattice, or netting, has on the short-fiber layers repeating, fold- or wave-shaped elevations. In the manufacturing process, all of the layers of the laminate are subjected together to a shrinkage process at a temperature which lies between the softening and melting points of the scrim material.

10 Claims, 1 Drawing Sheet

Figure 1:
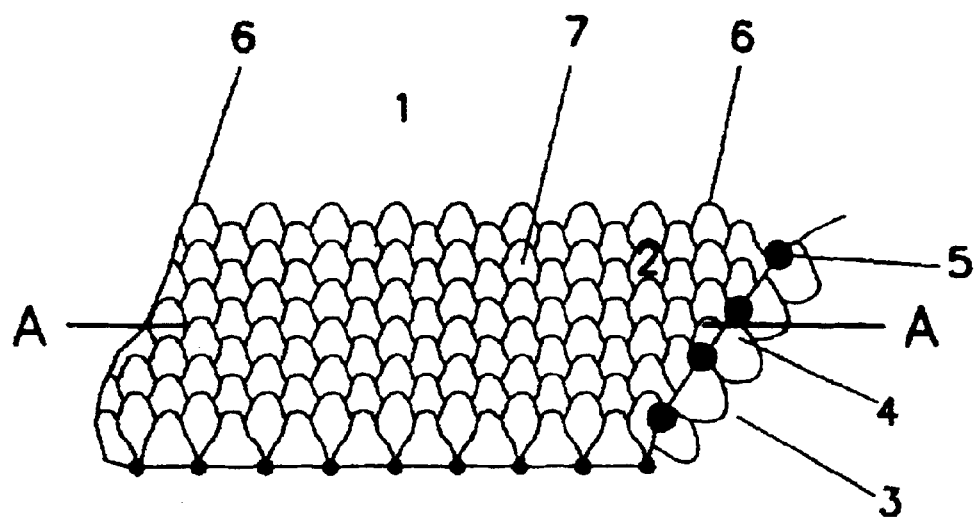

U.S. Patent    Apr. 20, 2004    US 6,723,416 B1

FLAT NONWOVEN FIBER AGGREGATE WITH THREE-DIMENSIONAL STRUCTURE AND METHOD FOR ITS PRODUCTION

FIELD OF THE INVENTION

The present invention relates to a three-dimensionally structured fibrous web and a method for manufacturing a three-dimensionally structured fibrous web.

By "three-dimensionally structured" is meant here fibrous webs in which the orientation and the spatial coordination of the individual fibers with respect to each other in any given surface plane diverge from those in the next closest surface plane.

In particular, the present invention relates to the field of fibrous webs, in which nonwoven fabric layers are bonded on both sides to at least one layer made of a scrim, a lattice, or a netting and a method for its manufacture.

BACKGROUND INFORMATION

U.S. Pat. No. 4,302,495 showns fibrous webs.

One or a plurality of layers made of discontinuous, thermoplastic polymer fibers and one or a plurality of layers composed of an open-mesh netting made of coarse, thermoplastic, continuous melt-blown fibers, which cross each other at a preestablished angle, are bonded to each other by thermal fusing, either continuously or in spot fashion, to produce a web having a uniform thickness. The randomly running short fibers have a diameter of between 0.5 and 30 $\mu$m at a weight per unit area of 10 to 15 g/m². Both the combination, lattice/microfiber layer/lattice, as well as microfiber layer/lattice/microfiber layer are described. A material that may be preferred for both the microfibers as well as the filaments of the lattice is polypropylene. A web of this type may have a very high tensile strength, together with a porosity that can be precisely adjusted. The melt-blown microfiber layers determine the external appearance and, for example, the filtering properties, whereas the thermoplastic netting(s) aid in reinforcement, controlling the porosity, and, if appropriate, simulating the appearance of a woven textile fabric. Therefore, the material may be suitable not only for use as filters, but also as a sterile packing material in surgery. Further application areas may be chemically inert filter media or non-wettable, light-weight, thermal insulating layers for clothing, gloves, or boots.

The thermal bonding of the layers to each other may be carried out under pressure, for example, between heated rolls, one of which having the appropriate engraving if spot-bonding is desired. In addition, heat radiation may be applied before the heating is carried out between the rolls. The level of the heating effect may be set so that the fiber materials soften without undergoing a temperature increase to the level of their crystalline melting point.

It was discovered that fibrous webs of this type may not stand up to pressure spikes or other powerful mechanical forces over a longer period of time without significant compaction, if, when packed, stored for extended periods, and transported, they are exposed to high pressures and temperatures up to 60° C., which is entirely usual in a shipment to tropical countries.

In addition, three-dimensional webs are disclosed in U.S. Pat. No. 4,522,863; British Patent 1 331 817; U.S. Pat. No. 5,525,397 and WO 98/52458, the webs being composed of a scrim, lattice, or netting and being bonded to nonwoven fabric layers on both sides.

SUMMARY OF THE INVENTION

An objective of an exemplary embodiment and/or exemplary method the present invention is to indicate a three-dimensionally structured fibrous web which stands up to pressure spikes up to 1 psi acting perpendicular to the surface plane without being destroyed, even at temperatures up to 60° C.

According to an exemplary embodiment of the present invention, at least two nonwoven fabric layers are bonded, in each case, to one scrim layer. The nonwoven fabric layers are made up of fibers that are bonded to each other mechanically and/or thermally and that, in the surface direction, possess a fold-like pattern in the form of geometric, repeating elevations or undulations.

Present in the above exemplary embodiment of the present invention is at least one thermoplastic scrim, lattice, or netting layer having continuous filaments crossing each other and bonded at the crossing points by fusion, the filaments having a thickness of 150 to 2000 $\mu$m between their crossing points, and having thickenings at the crossing points of up to seven times these values. For reasons of simplicity, this layer hereinafter is always termed a scrim, even if other structures having crossing individual filaments are at issue.

The mesh size of the scrim of the above exemplary embodiment, i.e., the distance in each case between two adjacent filament crossing points in the longitudinal direction, multiplied by the corresponding distance in the transverse direction, is 0.01 to 9 cm², assuming that the filament crossing points in the longitudinal as well as in the transverse direction have a distance from each other that is not less than 0.10 cm.

The specific bond between fiber layers and the scrim layers may be of the spot type.

In further exemplary embodiments of the present invention, the continuous filaments of the scrim are made up, for example, of polyethylene, polypropylene, polyamide-6, polyamide-6.6, polybutylene terephthalate, polyethylene terephthalate, polyester elastomers, copolyesters, copolymers made of ethylene and vinyl acetate or of polyurethane.

In a further exemplary embodiment of the present invention, the scrim is made up of a netting that is biaxially elongated. The elongation in the direction of both filament patterns is carried out in accordance with known methods in the longitudinal direction by by passing through the gap between a slower moving and a more rapidly moving roll, the elongation ratio thus being determined by the ratio of the more rapidly moving to the more slowly moving rolls. In the transverse direction, the elongation is carried out using an expanding tenter frame.

This known method brings about a reduction in the thickness of the filaments between the mutual crossing points and therefore a reduction in the weight per unit area of up to 95%.

According to an aspect of a further exemplary embodiment of the present invention, it is possible to carry out the double-sided covering of the scrim using nonwoven fabric such that each nonwoven fabric layer has different properties with respect to the configuration of its folds or with respect to its inherent properties, such as weight per unit area, type of fiber, and fiber bonding.

In general, in selecting the parameters for the nonwoven fabrics with respect to composition, type of fiber, fiber bonding, and fiber orientation, the worker skilled in the art is guided by the properties known to him that these layers are supposed to have. In the interest of a high inherent rigidity of the elevations and undulations, it is necessary for the nonwoven fabric fibers to be intensively bonded to each other.

If the fibers are fixed using a bonding agent, a bonding agent having a hard grip is preferable, because in this way the inherent rigidity and mechanical resistance of the fibrous web is increased overall.

It is believed that it is advantageous if the distance from one filament crossing point to the next one in the scrim, as well as the degree of elongation and the filament strength in the longitudinal and transverse directions, are approximately the same, because in this way, after the shrinking process, elevations are produced having a circular base cross-section. These have proven to be the most resistant to pressure loads exerted perpendicular to the surface plane.

Depending on the starting material selected, multilayer fibrous webs may be produced having weights of 20 to 3000 $g/m^2$. Products having lower weights per unit area are-suitable, for example, for layers in diapers that absorb and distribute liquid, such as have up to 3000 $g/m^2$ for high-volume filter matting, which have a high retention capacity for the filtrate.

The present invention is explained in greater detail on the basis of the Figure:

FIG. 1 shows an exemplary embodiment of the present invention in a top view.

DETAILED DESCRIPTION

First, FIG. 1 is described: here an exemplary embodiment of a three-dimensionally structured fibrous web according to the present invention is represented in a top view. Composite I is composed of shrunk scrim 4 and both nonwoven fabric layers 2 and 3. They are bonded to the shrunk scrim but not to each other, such that, on both sides of the scrim, elevations 6 and depressions 7 are formed on the nonwoven fabrics. Between and beneath the elevations are located hollow spaces 12, 13, which are permeable to fluid media and which absorb particles and dust from them. The scrim is made up of monofilaments 5 that cross each other.

An exemplary embodiment of a method for manufacturing the three-dimensionally structured fibrous web according to the present invention is carried out by covering, in a planar fashion, a 3–300 $g/m^2$ heavy, unshrunk scrim, netting, or lattice made of thermoplastic continuous filaments with a nonwoven fabric on both sides and by bonding using generally known laminating techniques to form a planar nonwoven fabric. The nonwoven fabric can have been produced using all known measures, i.e., dry using combing, carding, or air exposure technology, using wet deposition, or using fibers that are spun from the melted mass, or continuous filaments. Subsequently, the composite is subjected to a thermal treatment, which is sufficient for the scrim to undergo a surface shrinking. The nonwoven fabric layers, which themselves undergo either no surface shrinkage or one that is significantly less in comparison to the scrim, give way perpendicular to the surface plane, forming elevations. The nonwoven fabric can be bonded generally either over the entire surface or over a partial surface. Perforated nonwoven fabrics can also be used for the method according to the present invention.

As a result of a further increase in temperature, the scrim in the nonwoven fabric is made to shrink. The shrinking temperature is determined in accordance with the softening and melting range of the thermoplastics on which the scrim is based. To trigger a shrinkage, the temperature must lie between these two temperatures, the amount of shrinkage becoming higher the closer the temperature current actually affecting the knitted fabric approaches the melting temperature of the thermoplastic. Of course, the worker skilled in the art knows that, at the preestablished shrinkage temperature, the duration also exerts an influence on the extent of the surface shrinkage. The attainable amounts of shrinkage in the longitudinal and transverse directions, and the ratio of both amounts to each other, can be substantially predetermined by the choice of the scrim. Assuming an unhindered shrinkage free of contact, the ratio of longitudinal and transverse shrinkage is 1:1 if the monofilaments of the scrim have the same titer and the same rate of stretching in the longitudinal and transverse directions. If a different shrinkage is desired in the longitudinal and transverse directions, then knit fabrics are selected whose monofilaments have been stretched differently in the longitudinal and transverse directions, or whose titers turn out to be very different given the same rate of stretching. Scrims can also be used whose monofilaments in the longitudinal and transverse directions are created from different thermoplastics. In this case, the degree of shrinkage and the direction of shrinkage are determined by the components of the scrim, softening at a deeper level, a shrinkage temperature being selected which lies between the softening and the melting temperatures of the lower-melting components of the scrim.

The nonwoven fabric bonding and the lamination onto the scrim can also be carried out in one single step. Economy argues for this method.

As a nonfibrous bonding agent, liquid plastic dispersions are used, which are imprinted upon the composite either on one or on both sides, or a complete impregnation is carried out using a foamed mixture in a foam impregnating device or using an unfoamed mixture in a complete bath impregnation using the liquid plastic dispersions. Subsequently, drying is carried out and the bonding agent is cured in the heat.

As a result of the thermoplastic activation of the adhering fibers within the nonwoven fabric, additional interior reenforcement can be generated.

The ratio between longitudinal and transverse shrinkage determines the shape of the elevations in the nonwoven fabric layers. In a longitudinal/transverse ratio of 1:1, cone-shaped elevations arise that have, ideally, circular bases. In a longitudinal/transverse ratio not equal to 1, elevations arise having, ideally, oval cross-sections parallel to the base. If the shrinkage is completely prevented, for example, only in the longitudinal direction, in the longitudinal pattern, continuous, groove-shaped elevations are formed on the nonwoven fabric, which, ideally, have the same amplitude over their entire length.

It was surprising that scrims having weights under 10 $g/m^2$ can be shrunk to up to 80% of the starting length despite the nonwoven fabric covering on both sides having weights of at least 7 $g/m^2$. It would have been expected that the nonwoven fabrics would prevent the shrinkage of the scrim, especially at the lower starting masses per unit area of the scrim. However, this is not the case.

The following method variants of the above exemplary embodiment of the method according to the present invention may be especially advantageous for reasons of simplicity: The scrim is covered on both sides with an unbonded nonwoven and is subjected to a thermal embossing-calendering or ultrasound calendering. The resulting, planar, three-layer fabric has sufficient bond strength. Subsequently, without using a bonding agent, the shrinking is carried out thermally or using water vapor. For these method variants, bicomponent fibers are used having a side-by-side, eccentric or concentric core/sheath structure. The nonwoven fabric covering(s) can be made 100% of this bicomponent fiber or it can be used in a blend using thermoplastic and/or non-thermoplastic homofil fibers. With respect to the choice of homofil fibers, no limitations are necessary.

The melting point of the bicomponent fibers, in comparison to the lower melting components, must be lower or equal to the melting point of the individual scrim filaments that trigger the shrinkage. It is expedient if the melting point difference is not greater than 40° C. to prevent the nonwoven fabric layers from becoming very brittle.

Even if the use of thermoplastic polymers contributing to the melting bonding is not critical, it has proven to be advantageous, in a single-side nonwoven fabric covering, to use melting components which have a chemical similarity to the thermoplastic polymers of the scrim. Otherwise, the danger arises of a poor bond strength after the lamination. In this connection, it is advantageous, for example for a scrim made of polyethylene terephthalate filaments, to use in the nonwoven fabric, polyester bicomponent fibers having copolyesters or polybutylene terephthalate, which melt at over 200° C. as the sheath components.

Especially if the scrim and the nonwoven fabric are supposed to be bonded using thermal embossing-calendering or ultrasound reinforcement, it is advantageous to cover the scrim on both sides with nonwovens. After the calendering, both nonwovens above and below the scrim are bonded to each other in their open areas in a pattern. The scrim in this way is inserted into the composite so as to be inseparable. The number of thermal bonding points between the nonwoven fabric and the scrim in this unshrunk half-finished material is very low to the point of being negligible. The engraved surface of the embossing roll amounts to 4–30% of the entire contact surface.

In particular in the case of a slight difference in the melting temperatures between the scrim and the shell components of the bicomponent fibers, engraving rolls are preferably used having a bonding surface of only 4–14% of the entire surface.

The shrinkage is already triggered by a thermal treatment that occurs only once. Once it has been shrunk and cooled, the laminate cannot once again be brought to the point of shrinking by a second thermal treatment.

The multilayer, three-dimensionally structured fabric web according to the present invention can be composed of nonwoven fabric and scrim, in alternating fashion. The nonwoven fabrics on both sides of the scrim can be equal or unequal both in construction as well as in weight. In special cases, it is also possible to provide for interior layers made of two nonwoven fabrics adjacent to each other.

The structured fibrous web can be used in all areas in which a high specific surface and a high fluid throughput are present along with a large particle retention capacity or a high compression strength in response to mechanical loads, especially at increased temperatures. Examples are filters as well as hygiene or medical products. The products according to the present invention can also be used for decorative purposes around the house, such as wall coverings.

EXAMPLE 1

A biaxially elongated plastic netting made of polypropylene continuous filaments, having a weight of 7.8 g/m² and a mesh width of 7.6 mm×7.6 mm, is positioned between two cross-laid, loose, staple nonwovens each having a weight of 10 g/m² and is conveyed to a spot welding reinforcement by calendering between a smooth and an engraved steel roll. The welding surface of the engraved roll amounts to 9.6% at an engraving depth of 0.73 mm. The calendering process takes place at a temperature of 140° C. and at a line pressure of 30 kp/cm at a through-flow speed of 6 m/min. The width of the fabric is 50 cm.

The nonwoven fabric is composed of 90% core/sheath fibers having a core made of polyethylene terephthalate and a sheath made of copolyester, which melts at 120° C. The rest is viscose staple fiber. The titer of the core/sheath fiber amounts to 4.8 dtex and its cut length is 55 mm. The titer of the viscose staple fiber amounts to 3.3 dtex at a cut length of 60 mm.

The three-layer, planar fibrous web having an overall weight of 27.8 g/m² is subsequently subjected to a thermal shrinking treatment in a belt dryer at 170° C. and a duration of 2 min and 20 s. The original 50-cm-wide half-finished material after the shrinkage and cooling has a width of only 16 cm and a weight per unit area of 20 g/m². From this can be calculated a linear shrinkage in the transverse direction of 68%, a surface shrinkage of 76.8%, and a linear shrinkage in the longitudinal direction of 27.6%.

The mathematical formulas for the shrinkage calculation are:

$$S_0 = \left(1 - \frac{G_v}{G_n}\right) \cdot 100 \ [\%]$$

$$S_q = \left(1 - \frac{b_n}{b_v}\right) \cdot 100 \ [\%]$$

$$S_L = \left(1 - \frac{G_v \cdot b_v}{G_n \cdot b_n}\right) \ [\%]$$

$G_v$ weight per unit area before shrinkage in g/m²
$G_n$ weight per unit area after shrinkage in g/m²
$b_v$ width of the fabric before shrinkage in m
$b_n$ width of the fabric after shrinkage in m
$S_o$ surface shrinkage in %
$S_q$ linear shrinkage in the transverse direction in %
$S_l$ linear shrinkage in the longitudinal direction in %

In the following table, the thicknesses are represented, measured under varying loads at room temperature and after a storage time of over 48 hours at a load of 1 psi. Using the formulas indicated below, compression resistance K is calculated in addition to rerecovery W, and creep resistance KB, each expressed in %. The thickness measurement for calculating the creep resistance is carried out at 0.2 psi contact pressure.

The thickness measurements were carried out as follows:
The sample was subjected for 30 seconds to a contact pressure of 0.6205 kPa psi and the thickness value was read out after the 30 seconds had elapsed. Immediately thereafter, the contact pressure was increased on the thickness measuring device to 1.3789 kPa by changing the weight, and the thickness was also read out after a further 30 seconds at precisely the same measuring location.

The same process was repeated, in each case for 30 seconds, in the sequence of contact pressures 3.4473, 6.8947, and again 0.6205 kPa.

To determine creep resistance KB, the test sample was subjected for 48 hours to a pressure of 1 psi at 60° C., and thereupon the thickness was determined at the contact pressure of 1.3789 kPa.

KW, W, and KB are calculated as follows; The value for Kw is obtained by dividing the thickness at 6.8947 kPa by the thickness at 0.6205 kPa and multiplying by 100 (result in %).

The value for W is obtained by dividing the thickness at 6.8947 kPa, at the completion of the measuring cycle, by the previously measured value at 6.8947 kPa and multiplying by 100 (result in %).

The value for KB is obtained by dividing the thickness of the test sample that is pressed at 60° C. for 48 hours at 6.8947 kPa by the thickness of the unpressed test sample, in each case measured at 1.3789 kPa, and multiplying by 100 (result in %).

| Unpressed layer construction thickness at | | Pressed fibrous web at 60° C. for 48 hours thickness at | |
|---|---|---|---|
| 0.6205 kPa | 4.996 mm | | |
| 1.3789 kPa | 4.560 mm | 1.3789 kPa | 2.485 mm |
| 3.4473 kPa | 4.168 mm | | |
| 6.8947 kPa | 3.547 mm | | |
| 0.6205 kPa | 4.318 mm | | |
| KW (%) | 71.00 | | |
| W (%) | 86.40 | KB (%) | 53 |

What is claimed is:

1. A three-dimensionally structured fibrous web comprising: a composite, the composite being subjected to one of a thermal embossing-calendering and an ultrasound calendering and being shrunk by an influence of one of heat and water vapor; wherein the composite comprises one component selected from the group consisting of a scrim, a lattice and a netting; the one of the scrim, the lattice and the netting being covered on both sides by a nonwoven fabric; wherein the one of the scrim, the lattice and the netting is made of thermoplastic continuous-filaments having a mesh, the mesh having points of contact and filament crossing points in longitudinal and transverse directions; wherein the mesh has a mesh size of 0.01 to 9 $cm^2$; wherein the continuous filaments are 150 to 2000 $\mu m$ thick and are thermally fused to each other at their points of contact, wherein the filament crossing points in the longitudinal and transverse directions are not less distant from each other than 0.10 cm, and wherein the nonwoven fabric layer has one of repeating fold-shaped elevations and repeating wave-shaped elevations.

2. The fibrous web according to claim 1, wherein the thermoplastic continuous-filaments of the one of the scrim, the lattice and the netting have a first thickness at the crossing points and a second thickness between the crossing points, the first thickness being up to seven times the second thickness.

3. The fibrous web according to claim 2, wherein the nonwoven fabric has individual fibers, the individual fibers being bonded to each other using a bonding agent that has a hard grip.

4. The fibrous web according to claim 2, wherein the nonwoven fabric is made up of one of core bicomponent fibers, sheath bicomponent fibers and side-by-side bicomponent fibers, the one of the core bicomponent fibers, the sheath bicomponent fibers and the side-by-side bicomponent fibers consisting of components, the components being different with respect to their softening point.

5. The fibrous web according to claim 1, wherein the nonwoven fabric has individual fibers, the individual fibers being bonded to each other using a bonding agent that has a hard grip.

6. The fibrous web according to claim 1, wherein the nonwoven fabric is made up of one of core bicomponent fibers, sheath bicomponent fibers and side-by-side bicomponent fibers, the one of the core bicomponent fibers, the sheath bicomponent fibers and the side-by-side bicomponent fibers consisting of components, the components being different with respect to their softening point.

7. A method for manufacturing a three-dimensionally structured fibrous web comprising the following steps: covering at least one component selected from the group consisting of a lattice layer, scrim layer, and netting layer with a nonwoven fabric layer on both sides, each layer of the at least one lattice layer, scrim layer and netting layer weighing 3 to 300 $g/m^2$, the at least one lattice layer, scrim layer and netting layer being made of plastic continuous filaments having a mesh, the mesh having filament crossing points and having a mesh size of 0.01 to 9 $cm^2$ and being biaxially stretched, a distance of adjacent ones of the filament crossing points being not less than 0.10 cm; bonding the at least one lattice layer, scrim layer and netting layer with the nonwoven fabric layer on both sides in continuous fashion using a laminating technique, subjecting the at least one lattice layer, scrim layer and netting layer with the nonwoven fabric layer on both sides which has been bonded by one of a thermal embossing-calendering and an ultrasound calendering; and subsequently subjecting the at least one lattice layer, scrim layer and netting layer with the nonwoven fabric layer on both sides which was subjected to one of thermal embossing-calendering and ultrasound calendering to a shrinking process at a temperature which lies between a softening and melting range of a material of the at least one lattice layer, scrim layer and netting layer.

8. The method according to claim 7, further comprising the steps of: covering the at least one lattice layer, scrim layer and netting layer on one side or both sides with an unbonded nonwoven, the at least one lattice layer, scrim layer and netting layer having a shrinkable component, the shrinkable component having a melting point, the unbonded nonwoven being made up at least partly of bicomponent fibers having a high- and a low-melting component, the low-melting component having a melting point that is not higher than the melting point of the shrinkable component; subjecting the at least one lattice layer, scrim layer and netting layer covered on one side or both sides with the unbonded nonwoven by one of thermal embossing-calendering and ultrasound calendering, and subsequently carrying out a shrinking the at least one lattice layer, scrim layer and netting layer covered on one side or both sides with the unbonded nonwoven which was subjected to the one of thermal embossing-calendering and ultrasound calendering, the shrinking being carried out as a result of the influence of heat or using water vapor.

9. The method according to claim 8, further comprising the step of:
stretching the one of the at least one lattice layer, the at least one scrim layer and the at least one netting layer in a longitudinal direction between rolls that are running at different speeds, and in a transverse direction using an expanding tenter frame.

10. The method according to claim 7, further comprising the step of:
stretching the one of the at least one lattice layer, the at least one scrim layer and the at least one netting layer in a longitudinal direction between rolls that are running at different speeds, and in a transverse direction using an expanding tenter frame.

* * * * *

UNITED STATES PATENT AND TRADEMARK OFFICE
CERTIFICATE OF CORRECTION

PATENT NO. : 6,723,416 B1
DATED : April 20, 2004
INVENTOR(S) : Groitzsch et al.

It is certified that error appears in the above-identified patent and that said Letters Patent is hereby corrected as shown below:

Title page, Item [54] and Column 1, line 1,
Title, change "FLAT NONWOVEN FIBER AGGREGATE WITH THREE-DIMENSIONAL STRUCTURE AND METHOD FOR ITS PRODUCTION" to -- THREE-DIMENSIONALLY STRUCTURED FIBROUS WEB AND A METHOD FOR ITS MANUFACTURE --;

Column 8,
Line 46, change "a shrinking the" to -- a shrinking of the --.

Signed and Sealed this

Seventeenth Day of May, 2005

JON W. DUDAS
*Director of the United States Patent and Trademark Office*